3,068,071
DETERMINATION OF UREA

Léon Velluz, Paris; Daniel Bertin, Montrouge; Maurice Pesez, Paris; and René Berret, Fontenay-aux-Roses, France, assignors to Roussel-UCLAF Societe Anonyme, Paris, France
No Drawing. Filed Apr. 16, 1959, Ser. No. 806,794
Claims priority, application France May 14, 1958
6 Claims. (Cl. 23—230)

This invention relates to a process for the preparation of a radioactive xanthydrol tagged with a carbon[14] isotope and its use in the microassay of urea in physiological fluids.

For the determination of urea in fluids, particularly in the blood, either a volumetric procedure, based on oxidation of the urea by sodium hypobromite and measurement of the volume of nitrogen liberated thereby, or the gravimetric method of R. Fosse (Comptes rendus Acad. Sci., 1914, 159, pages 367 and 369), based on the formation of a dixanthyl-urea, insoluble in an acetic acid medium, have heretofore been generally used.

These two methods involve the inconvenience of necessitating the use of a sufficiently large amount of blood, approximately on the order of 10 cc. The supply of this large amount of blood must be accomplished by puncturing a vein and withdrawing the required amount. The gravimetric method, in addition, has the disadvantage that it involves loss of time since it requires drying and weighing of the dixanthyl-urea.

It is an object of the present invention to enable the accurate determination of urea in physiological fluids when only small amounts of fluids are available.

It is another object of this invention to develop a method of urea determination which can be conducted by semi-skilled personnel with a high degree of accuracy.

It is a still further object of this invention to develop a process for the production of radioactive xanthydrol tagged with a carbon[14] isotope.

Another object of this invention is the production of xanthydrol tagged with a carbon[14] isotope in the 9 position, xanthone tagged with a carbon[14] isotope in the 9 position, and o-phenoxy-benzoic acid tagged with a carbon[14] isotope in the carboxyl group.

These and other objects of the invention will become apparent as the description proceeds.

We have found that radioactive xanthydrol, which has a carbon atom isotope with an atomic weight of 14 attached in the 9-position, and which is obtained by the process disclosed in the present specification, can be used in the determination of urea in small amounts of fluid. This makes it possible to avoid the inconvenience of withdrawing blood from a vein. A simple incision in the finger tip made with a vaccinostyle is enough to collect the 0.1 to 0.2 cc. of blood which is necessary for the determination of urea by means of the present invention. The urea is precipitated in the form of the tagged dixanthyl-urea and merely washed or re-dissolved in a mixture of sulfuric acid and alcohol. A simple measurement of the radioactivity of the tagged dixanthyl-urea precipitate will determine the amount of urea in the blood. The weighing step is thus avoided while at the same time an operator with elementary technical skill can obtain a remarkable precision.

In accordance with the present invention, the tagged xanthydrol is obtained from o-phenoxy-benzoic acid ($C^{14}OOH$), which in turn is prepared by carboxylation of o-phenoxy-phenyl magnesium iodide with tagged carbon dioxide gas. The tagged o-phenoxy-benzoic acid is cyclized into tagged xanthone by the action of acetyl chloride at elevated temperatures in the presence of sulfuric acid, and the tagged xanthone is reduced to tagged xanthydrol with powdered aluminum in the presence of potassium hydroxide.

The following examples serve to illustrate the invention without limiting it. More particularly, the tagged xanthydrol may be used for the determination of urea in fluids other than blood. It is possible to make xanthydrol which is tagged at a carbon atom other than the carbon in the 9-position or tagged with the aid of tritium without departing from the spirit of our invention. However, xanthydrol tagged at the carbon atom in the 9-position constitutes the most accessible radioactive form of this compound. The preparation of the intermediate compounds and of tagged xanthydrol is carried out with the customary precautionary measures used in working with products tagged with the radioactive carbon[14] isotope.

EXAMPLE I

*Preparation of Tagged o-Phenoxy-Benzoic Acid*
($C^{14}OOH$)

890 mg. of o-phenoxy-iodobenzene, 87.5 mg. of powdered magnesium and 15 cc. of anhydrous ether are introduced into a Grignard apparatus made entirely of glass for the preparation of organo magnesium compounds accompanied by mechanical agitation and in a stream of dry nitrogen free from carbon dioxide. The reaction proceeds fairly rapidly and diminishes in vigor at the end of half an hour, accompanied by crystallization of the magnesium compound. The mixture is boiled under reflux for another ½ hour, whereupon the crystalline magnesium compound is allowed to cool while in suspension in the ether without interrupting the flow of nitrogen.

The flask containing the magnesium compound in suspension is connected to an apparatus adapted to operate at a high vacuum and having a series of valves. By decomposing 395.8 mg. of barium carbonate $BaC^{14}O_3$ (total activity 2.4 mc.) with sulfuric acid, tagged carbon dioxide is liberated which is condensed in a tube cooled to —190° C., the connection between the tube and the apparatus having a series of valves being closed. As soon as all of the carbon dioxide is condensed, the connection between the tube and the $CO_2$ generator is closed, the flask containing the suspended magnesium compound is cooled to —190° C., the connection between the flask, the apparatus having a series of valves, and the tube is opened and the tube is heated to —75° C. in order to sublime the tagged carbon dioxide into the flask containing the magnesium compound. The connection between the flask and the apparatus having a series of valves is closed, the mixture in the flask is agitated for ½ hour at room temperature and the preceding process is repeated to complete the reaction of the $CO_2$ with the magnesium compound, that is, by cooling the flask to —190° C., the $CO_2$ tube being maintained at —75° C. and the connection being again established. The temperature is then allowed to rise to room temperature, the mixture is agitated for ½ hour, and the vacuum is replaced by nitrogen free from $CO_2$. The suspension is decomposed with 15 cc. of $CO_2$-free distilled water and acidified with a few cc.'s of sulfuric acid. The contents of the flask are passed into a separating funnel. The reaction apparatus is rinsed with methylene chloride and the rinsings are also added to the material in the separating funnel. The mixture is decanted. The organic phase containing the tagged o-phenoxy-benzoic acid is extracted with sodium carbonate and the combined alkaline liquors are washed with methylene chloride and then heated under a slight vacuum to about 70° C. in order to drive off the solvent. The vacuum is broken and the mixture is acidified with sulfuric acid while hot. The tagged o-phenoxy-benzoic acid ($C^{14}OOH$) precipitates out. After cooling, the liquid is drained off and the solid is washed with water until the wash water is neutral and is then dried. The dried acid, crystallized into small needles having a melting point of 115–116° C., weighs 405.5 mg. (representing a yield of 94.5% based on the amount of radioactive barium carbonate used) and is sufficiently pure for use in the ensuing reactions. It has the following structural formula:

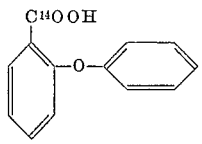

EXAMPLE II

*Preparation of Tagged Xanthone ($C^{14}$ in 9-Position)*

405.5 mg. of tagged o-phenoxy-benzoic acid obtained in accordance with Example I are dissolved in about 9 cc. of pure acetyl chloride, and 8 drops of pure concentrated sulfuric acid are carefully added to this solution accompanied by agitation. A vigorous reaction develops after introduction of each drop of sulfuric acid. After the addition of sulfuric acid is complete the mixture is heated on a water bath under reflux for 10 minutes while agitating the mixture from time to time by hand in order to bring the reaction to completion. The reflux condenser is then removed and the acetyl chloride is distilled off on a water bath in a stream of nitrogen. The crystallization of the tagged xanthone occurs spontaneously and increases in proportion to the increased concentration. The acetyl chloride is evaporated as completely as possible until the residue solidifies. The contents of the flask is cooled to —15° C. and cracked ice and then water are added until the volume is about 20 cc. The mixture is filtered and the filter cake is washed first with water, then with a solution of sodium carbonate, and again with water, and finally dried. 367 mg. of tagged xanthone are obtained, which represents a yield of 99%, based on the amount of tagged o-phenoxy-benzoic acid ($C^{14}OOH$) originally used. The melting point is 174° C. The product may be used directly for its transformation into tagged xanthydrol. It has the following structural formula:

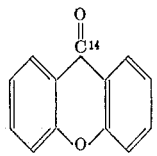

EXAMPLE III

*Preparation of Tagged Xanthydrol ($C^{14}$ in 9-Position)*

7.5 cc. of methanol and then 300 mg. of potassium hydroxide in pellet form and 200 mg. of powdered aluminum are added to the tagged xanthone obtained in accordance with Example II. The mixture is boiled under reflux for ½ hour, cooled on an ice bath, the unreacted aluminum is filtered off through kieselguhr and is washed with 3 cc. of methanol. The methanol used for washing the aluminum is combined with the filtrate and 45 cc. of water and ice are added thereto. The tagged xanthydrol separates out in the form of long colorless needles. The reaction mixture is chilled on ice, filtered, and the filter cake is washed with water until the wash water is neutral. Thereafter, the product is dried in a vacuum at room temperature over potassium hydroxide. 350.5 mg. of xanthydrol ($C^{14}$ in 9-position) are obtained, which represents a yield of 94%. Its melting point is 122–125° C. The product is subject to decomposition by heat and oxygen of the air and is preferably stored in a sealed tube. A 5% solution of it in methanol should give a clear, colorless solution; if not, it is purified by recrystallization. This is effected by adding water to the methanol solution which has previously been filtered. The xanthydrol thus obtained tests 1.2 mc. per millimol. The chemical yield is 88.5%, based on the amount of barium carbonate originally used. This tagged xanthydrol has the structural formula:

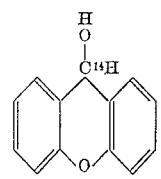

EXAMPLE IV

*Determination of Urea With Tagged Xanthydrol*

0.5 cc. of a 1% solution of tagged xanthydrol in acetic acid is added to 0.5 cc. of an aqueous solution of urea containing from 15 to 75 gammas of urea. The specific activity of this xanthydrol is adjusted, for example, to an activity of 10 microcuries per millimol, by dissolving the tagged xanthydrol, prepared in accordance with Example III in acetic acid and mixing with a solution of untagged xanthydrol.

After allowing the mixture to stand for an hour at room temperature the dixanthylurea is isolated by centrifuging, and then it is washed twice by suspending it in 1 cc. of alcohol saturated with dixanthylurea. It is then entrained in three 0.5 cc. portions of the same solvent and deposited on a metal dish by centrifuging. After decanting the solvent the precipitate is dried at 18–20° C. for 30 minutes and then at 80–100° C.

A radiometric measurement of the radioactivity of the precipitate is obtained over a period of 10 minutes with a Geiger-Müller counter and an automatic Ekco scale.

The number of impacts per minute (c.p.m.) obtained on the basis of known quantities of urea are determined in order to draw a calibration curve. In the present example the response is 390 impacts per minute for 15 gammas of urea and 2136 impacts per minute, corrected to the proper activity, for 75 gammas of urea.

In order to determine the urea content in an unknown sample of blood, the above procedure is followed, after separation of the serum in accordance with known methods and the amount of urea is read directly from the calibration curve in gammas per volume of blood sample.

It is readily apparent that small amounts of urea in any liquid can be determined by the above outlined procedure. One skilled in the art can perceive that various substitutions and modifications can be made in the above examples without departing from the spirit of our invention or the scope of the appended claims.

We claim:

1. A process of determining the amount of urea in a liquid which comprises adding to said liquid an excess of radioactive xanthydrol tagged with a radioactive isotope to form a radioactive dixanthylurea precipitate, separating the radioactive dixanthylurea precipitate, and measuring the intensity of radioactivity of said precipitate as compared with standard precipitates.

2. The process of claim 1 wherein said radioactive xanthydrol is tagged in the 9 position with a carbon[14] isotope.

3. The process of claim 1 wherein the radioactivity of said precipitate is measured with a Geiger-Müller counter over a ten minute period.

4. The process of determining the amount of urea in blood which comprises precipitating the urea as radioactive dixanthylurea by addition of radioactive xanthydrol tagged in the 9 position with a carbon[14] istotope to the blood, separating the radioactive dixanthylurea precipitate and measuring the intensity of radioactivity of said precipitate as compared with standard precipitates.

5. The process of claim 4 wherein the radioactivity of said precipitate is measured with a Geiger-Müller counter over a ten minute period.

6. In the process of determining the amount of urea in a liquid by adding to said liquid an excess of xanthydrol and precipitating dixanthylurea, the improvement which comprises adding as said excess of xanthydrol a radioactive xanthydrol of known radioactivity and determining the amount of urea by a measurement of the radioactivity of the radioactive dixanthylurea precipitate.

References Cited in the file of this patent

UNITED STATES PATENTS

| | | |
|---|---|---|
| 2,127,107 | Cassidy | Aug. 16, 1938 |
| 2,186,902 | Fortune | Jan. 9, 1940 |
| 2,194,131 | Terry | Mar. 19, 1940 |
| 2,505,284 | France | Apr. 25, 1950 |

OTHER REFERENCES

Alimarin: Proceed. of the Internat. Conference on the Peaceful Uses of Atomic Energy, vol. 15, August 1955, pages 60 to 72. The more specific pages relied upon are pages 65 and 66.

Cheosakul et al.: Proceedings of the 2nd U.N. Intern. Con. on Peaceful Uses of Atomic Energy, vol. 25, Isotopes in Biochemistry and Physiology, part 2, pages 30–38, 1958.

Lawrie: Clinic. Chem., vol. 3, 1957, pages 691–695.